A. JAEGER.
VEHICLE WHEEL.
APPLICATION FILED OCT. 28, 1910.
1,047,642.
Patented Dec. 17, 1912.
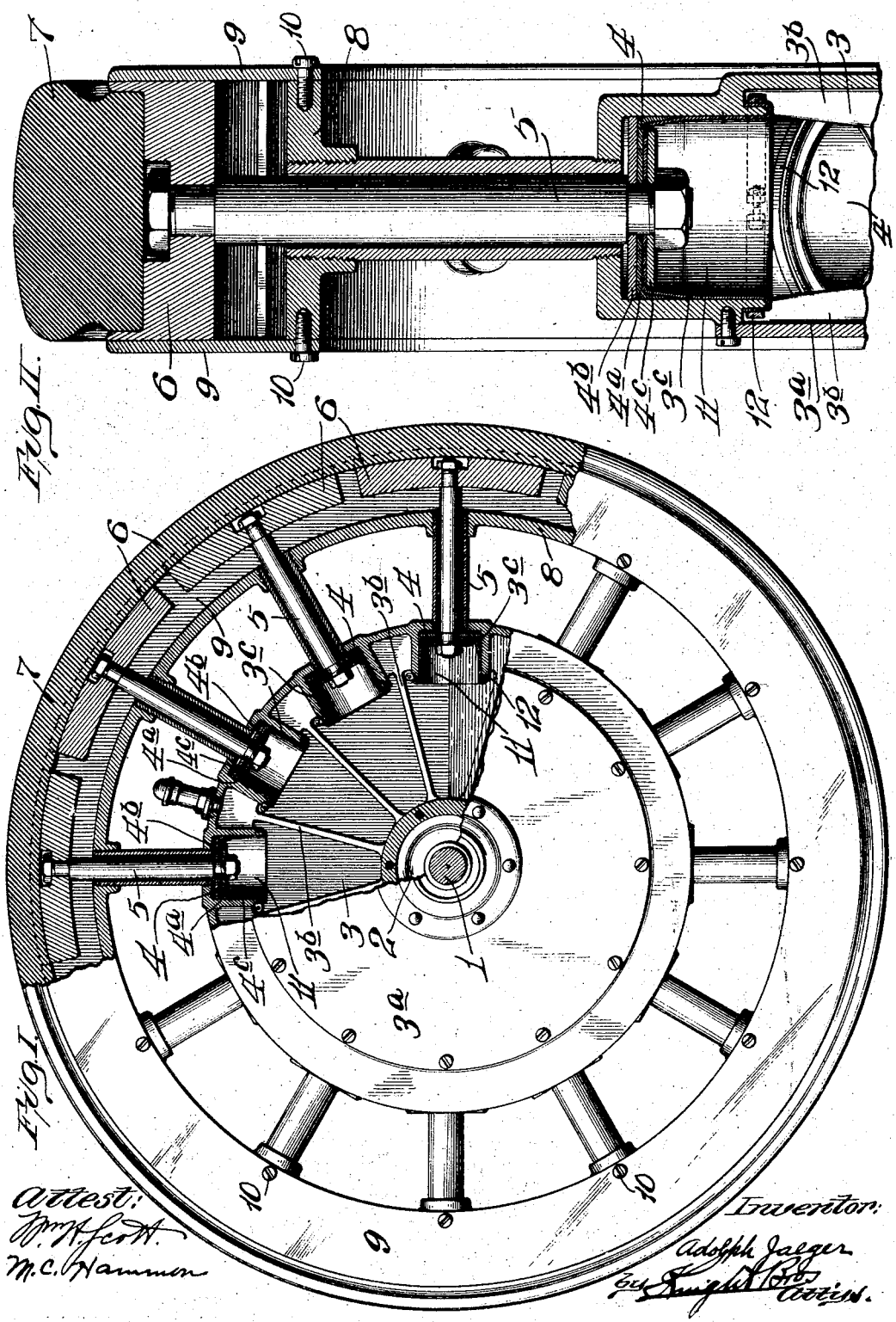

UNITED STATES PATENT OFFICE.

ADOLPH JAEGER, OF JACKSON, MISSOURI.

VEHICLE-WHEEL.

1,047,642.

Specification of Letters Patent. Patented Dec. 17, 1912.

Application filed October 28, 1910. Serial No. 589,522.

*To all whom it may concern:*

Be it known that I, ADOLPH JAEGER, a citizen of the United States, residing at Jackson, Cape Girardeau county, Missouri, have invented certain new and useful Improvements in Vehicle-Wheels, of which the following is a full, clear, and exact description, reference being had to the accompanying drawings, forming part of this specification.

Figure 1 is an elevation of a complete vehicle wheel equipped with my invention with parts removed to show the interior construction of such wheel; and, Fig. 2 is an enlarged vertical section through one half of said wheel.

An object of the present invention is to provide improvements in vehicle wheels and especially in that class of vehicle wheels having at least vertical flexibility; and a specific object of the present invention is to provide a wheel of this class with a durable construction and in which the inherent flexibility of the wheel does not depend upon springs, which become set or are rendered practically useless by mud, dirt or other foreign matter.

The further specific object of the present invention is to provide a wheel of the character set forth which will be simple in construction and the flexibility of which will be proportionate to the load carried, such a wheel as I have invented having the great advantage of presenting stiffer action to a heavier load than to a lighter load.

In accomplishing the foregoing objects, I construct a wheel with two main wheel members, an interior member or hub and an exterior member or felly, one of these members being supplied with a suitable axle box, the other being supplied with a suitable support for the tire or rim of the wheel. These two members are arranged to be movable relatively to each other and such movement is regulated through the medium of compressed air trapped in a suitable cylinder forming a part of either one member or the other of the wheel and acted upon by suitable pistons carried by the other member and working within the periphery of said cylinder. Having thus described the objects of my invention and generally the means whereby they are carried out, I will now proceed to describe the structure of a wheel in accordance with my invention.

In the drawings, 1 represents a wheel axle, 2 an axle box, and 3 a cylinder suitably mounted on said axle box, said cylinder comprising side plates and a chambered peripheral plate for purposes hereinafter described, one of said side plates $3^a$ being removable from the cylinder for the purpose of repairs and initial assembly, the other side plate being preferably an integral part of the cylinder. This cylinder is preferably formed of a casting, although the same may be made in any suitable acceptable manner. The cylinder 3 is provided with inwardly projecting reinforcing ribs $3^b$ forming a part of each of the side plates which add greatly to the strength of the cylinder, which must, of course, be of such strength as to withstand any load placed upon the wheel; and the cylinder 3 is furthermore provided with peripherally arranged sub-cylinders $3^c$ which receive pistons 4 mounted on piston rods 5 which carry at their upper ends through suitable connections tire shoes 6 which support an outer band or tire 7 of the wheel. Said outer band or tire 7 is preferably constructed of rubber.

Rising from the periphery of the cylinder 3 and opening into the respective sub-cylinders $3^c$, I have provided a series of piston rod guide sleeves or felly supporting spokes, supporting at their upper ends, by a suitable connection, shown in the drawings as a screw-threaded connection, a felly comprising an inner band 8 having secured thereto outwardly extending guide plates 9, shown in the drawings as secured to the band 8 by screws 10.

The shoes 6 which form a tire supporting rim are arranged to slide inwardly and outwardly under load effect between these plates 9 and form a protection against the ingress of dust, dirt and other foreign matter into the interior working parts of the wheel.

The pistons 4 are formed by suitable cup washers $4^a$ mounted on the piston rods 5 between washers $4^b$, $4^c$. The individual cylinders $3^c$ are closed by diaphragms 11 which are secured to the pistons 4 beneath their inner washers $4^c$ and which overlap the inner ends of the cylinders $3^a$ and are secured about said inner ends by a suitable clamping ring 12 (Fig. 2.)

The structure thus described performs the following functions: The load on the axle 1 is transmitted directly through the box 2 to the cylinder 3 downwardly through the tubular housings surrounding spokes 5 at the central portion of the bottom of the wheel to the felly which is adapted to move relatively to the outer band or tire 7 but inasmuch as said outer band 7 is connected by a piston rod 5 to the piston 4 which acts in the sub-cylinder 3°, such a sliding relative movement between the felly and the outer band 7 is resisted by a compression of the trapped body of air within the cylinder 3. And the greater the load, the greater the compression of the trapped body of air within the cylinder 3, and hence the resistance to the relative movement between the tire supporting rim 6 and the felly is proportionate to the load carried.

I prefer to charge the cylinder 3 initially with compressed air; and for this purpose, I have provided a valve 13 such as a Schraeder valve or automobile tire valve seated in the periphery of the cylinder 3; and as a further measure to insure an airtight cylinder 3, and durability of the interior or working parts of the wheel and to reduce friction to the greatest possible extent, my improved wheel construction is preferably lubricated by half filling the cylinder with any suitable lubricant, such, for instance, as castor oil. This initial pressure holds the diaphragms 11 extended or against the walls of the sub-cylinders 3° and as the pistons 4 move inwardly toward the axis of the wheel, these diaphragms 11 feed outwardly in close contact with the walls of the sub-cylinders 3° so that the bending of the diaphragm 11 is distributed generally over its surface and does not take place repeatedly at any one portion of the diaphragm, so that said diaphragm would crack or wear at such portion. Thus, the initial pressure within the cylinder in addition to providing a more effective cushioning means for the wheel serves as a medium of saving wear on the diaphragm. Of course, if the diaphragms should finally become worn so that the air escaped through them into the sub-cylinders 3° such air would be caught up by the beveled edges of the cup washers 4ª so that there exists a double valve packing effect for the respective pistons. The inwardly extending strengthening ribs 3ᵇ serve as paddles to splash or spread the castor oil or other lubricant over the interior of the cylinder, keeping the working parts thoroughly lubricated.

As shown in the drawings, the piston rods 5 consist of bolts which are housed in sleeves projecting at one end against the under surface of the shoes 6 and at the other end against the inner washer 4ᵇ. These sleeves bear directly against the inner band 5 and serve to space the shoes 6 from the piston 4. The nut for securing the piston 4 to the piston rod 5 is located on the inner side of the diaphragm 11.

What I claim is:

1. In a vehicle wheel, the combination with a cylindrical housing surrounding the hub, of radially disposed sub-cylinders extending inwardly from the inner cylindrical wall of said housing, said sub-cylinders having inside diameters approximately equal to the axial width of said hub housing, said cylindrical wall being provided with an aperture concentric with the outer end of each sub-cylinder, a felly provided with apertures corresponding to the first mentioned aperture, tubular spokes rigidly connecting said housing with said felly and having their ends registering with said apertures, respectively, a piston in each sub-cylinder, said pistons being provided with rods reciprocable in said tubular spokes, and tire supporting shoes secured respectively to the outer ends of said rods.

2. In a vehicle wheel, a felly, a hub chamber, sub-cylinders with inside diameters approximately equal to the axial width of said hub chamber, the peripheral wall of said hub chamber being provided with apertures of relative small size compared to said sub-cylinders, tubular spokes rigidly connecting said felly to said hub chamber at each of said apertures, piston rods reciprocable in said spokes, tire supporting elements mounted on the outer ends of said rods, pistons secured to the inner ends of said rods and fitting said sub-cylinders, and a removable side plate for said hub chamber which permits direct access to the open inner ends of said sub-cylinders.

3. In a vehicle wheel, the combination with a hub member comprising a plurality of radially disposed cylinders forming an air tight chamber, of a felly provided with spaced lateral guide plates, a tubular housing connecting each of said cylinders with said felly, a bolt reciprocable within each housing, said bolt being provided on its inner end with a piston slidably mounted within its cylinder, a tire supporting shoe mounted on the outer end of each bolt and slidably engaging the guide plates of said felly, said shoe being provided with flanges in sliding engagement with said guide plates, said flanges forming a tire receiving groove extending around the periphery of the wheel, and a tire mounted in said groove.

4. In a vehicle wheel, the combination with a hub member comprising a plurality of cylinders connected together to form a fluid-tight chamber, of a piston reciprocable within each cylinder, the inner faces of said pistons being provided with packing cups, a rim supported from said pistons, a flexible fluid-tight sleeve secured at one end around the inner edge of each cylinder and having its other end nested within said packing cup, and means secured to the inner end of each piston rod and clamping said sleeve to said packing cup.

5. In a vehicle wheel, the combination with a plurality of radially disposed cylinders connected to form an air tight chamber around the hub, each of said cylinders being provided with an aperture in its outer end wall, a felly, a tubular sleeve rigidly connecting said felly to each cylinder around said aperture, a bolt slidably mounted in each sleeve, said bolt being provided upon its inner end with a piston slidably engaging the inner walls of its cylinder, a flexible air-tight bag covering the inner walls of each cylinder and having its closed end against said piston, the open end of said bag being secured to the inner end of said cylinder around the edges thereof, a washer secured to each piston and clamping the closed end of said bag to said piston, and a relatively movable rim member connected to the outer ends of said bolts.

ADOLPH JAEGER.

In the presence of—
A. O. KNIGHT,
JULIA B. MEGOWN.

Copies of this patent may be obtained for five cents each, by addressing the "Commissioner of Patents, Washington, D. C."